Dec. 15, 1953

J. R. RHINEHART ET AL 2,662,549

MULTIPORT VALVE

Filed May 2, 1949

INVENTORS
Charles H. Eshrich, John R. Rhinehart
BY
Philip G. Hilbert
ATTORNEY

Dec. 15, 1953 J. R. RHINEHART ET AL 2,662,549
MULTIPORT VALVE
Filed May 2, 1949 4 Sheets-Sheet 3

INVENTORS
Charles H. Eshrich & John R. Rhinehart
BY
Philip G. Hilbert
ATTORNEY

Patented Dec. 15, 1953

2,662,549

UNITED STATES PATENT OFFICE 2,662,549

MULTIPORT VALVE

John R. Rhinehart, Ridgewood, and Charles H. Eshrich, Hasbrouck Heights, N. J., assignors to Belco Industrial Equipment Division, Inc., Paterson, N. J., a corporation of New Jersey Application May 2, 1949, Serial No. 90,958

12 Claims. (Cl. 137—634)

This invention relates to multiport valves. More specifically it concerns a multiport valve particularly adapted for controlling the flow of water or other liquids in predetermined paths through water softening units or other liquid handling devices through conduits interconnecting the same to the valve.

Valve devices heretofore available for such purposes are of a design which can handle water at only limited rates of flow. Accordingly an object of this invention is to provide an improved multiport valve designed to control water softening units of large capacity through which water passes at a substantial rate of flow.

A further object of this invention is to provide an improved multiport valve which is to be connected to conduits of substantial capacity, said valve including spring pressed, cam operated reciprocable disc or poppet valve members wherein said valve members are designed to be operated with springs of relatively small size.

Still another object of this invention is to provide an improved multiport valve which comprises a pair of chambers together with cam operated valve means in each of the chambers, the chambers being arranged in a manner whereby each of the chambers may directly receive raw water or alternatively, directly dispose of waste.

Still a further object of this invention is to provide a multiport valve for a water softening unit, comprising a unitary body formed with a plurality of chambers, a pair of the chambers being arranged in communicating relation to a third chamber, either of the pair of chambers being adapted to directly receive raw water or to directly dispose of waste, the third chamber being adapted to receive waste from either of the pair of chambers, selectively operated, cam controlled, valve members for controlling the communication between the pair of chambers and the third chamber, the cams being disposed in the third chamber and accessible for replacement or adjustment together with means on the valve members for adjusting the rate of flow of water through the softening unit during backwashing and rinsing operations.

A further object of this invention is to provide an improved multiport valve for a water softening unit, which comprises a body formed with a plurality of chambers, together with valve members disposed within the chambers for controlling the flow of raw water, soft water, waste and regenerating solution into and out of selected chambers, each of the valve members being of the cam operated, reciprocable disc or poppet valve type and being operable by a rotatable cam shaft, the opening and closure of the valve members occurring in accordance with a predetermined cyclical pattern of operation, the pattern of operation being such that the force necessary to rotate the cam shaft to initiate the opening of a closed valve member, is augmented by a force incident to the closure of an open valve member, the augmented force being transmitted to the cam shaft through the cam of the closing valve member.

Yet another object of this invention is to provide an improved multiport valve for controlling the operation of a water softening unit and comprising a unitary body formed with a plurality of liquid handling chambers, together with a cam shaft chamber adjacent the liquid handling chambers, reciprocable valve members in the liquid handling chambers including operating stems extending into the cam shaft chamber for engagement with cams on the cam shaft, the cam shaft chamber being adapted to collect any liquid leaking from the liquid handling chambers by way of the valve operating stems.

Yet a further object of this invention is to provide a rugged, durable, multiport valve, which is compact and fully contained in respect to all necessary controls for regulating the operation of a water softening unit and is practical and efficient to a high degree in use.

Other objects of this invention will in part be obvious and in part hereinafter pointed out.

The invention accordingly consists in the features of construction, combinations of elements, and arrangements of parts which will be exemplified in the construction hereinafter described, and of which the scope of invention will be indicated in the following claims.

In the accompanying drawings, in which is shown various illustrative embodiments of the invention:

Fig. 2 is a front elevational view thereof;

Figure 1:
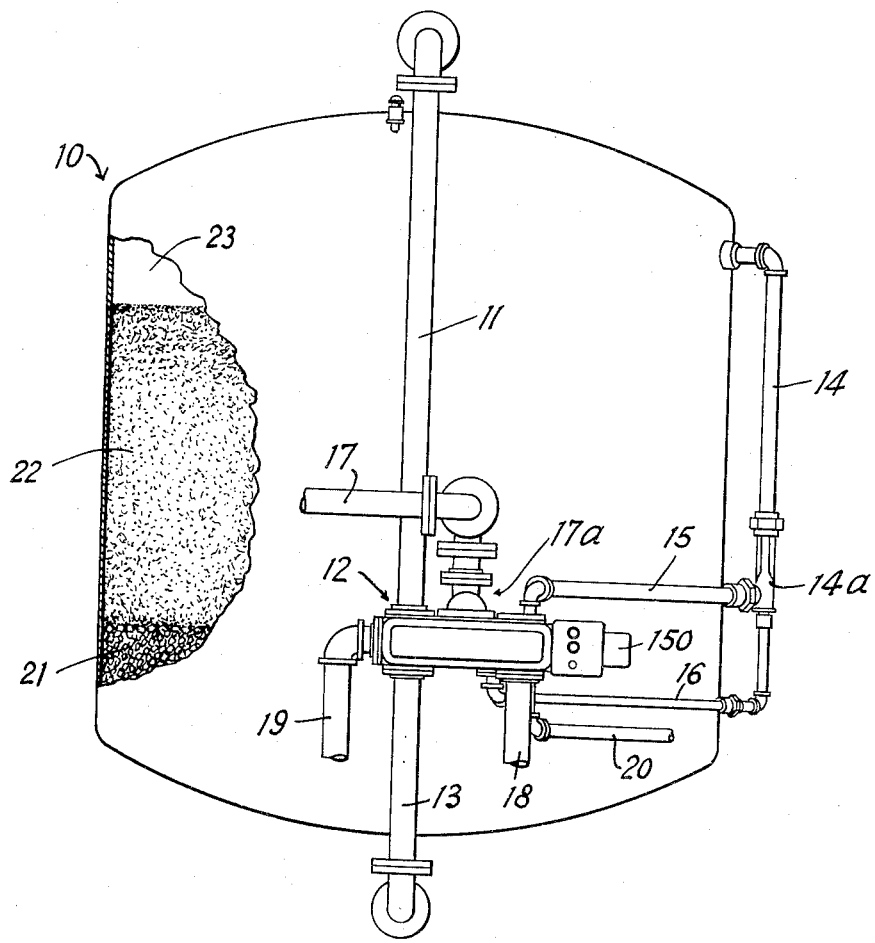
Fig. 1 is a front elevational view of a water softening unit with parts cut away and parts in section together with a multiport valve embodying the invention.

Referring in detail to the drawings, 10 designates a conventional, upstanding, cylindrical water softening unit having extending from the top wall thereof, a downwardly extending conduit 11 which is connected to a multiport valve 12 embodying the invention. A conduit 13, connected at one end to the bottom of the unit 10, is connected to the underside of valve 12.

A brine inlet conduit 14 extends downwardly from an upper portion of the sidewall of the unit 10 and includes an injector portion 14a, therein. The injector portion 14a of conduit 14, is connected to the valve 12 at its upper side by a conduit 15 and is further connected to the valve at its underside by a conduit 16.

An incoming raw water conduit 17 is connected to a distributing manifold 17a mounted on the upper side of the valve 12. A soft water conduit 18 extends from the underside of the valve 12 to a soft water service line, not shown. A waste conduit 19 extends from one end of the valve and may be connected to sewage disposal means, not shown. An incoming brine carrying conduit 20 interconnects the underside of the valve 12 and a source of brine, not shown.

Within the unit 10 there is placed at the bottom thereof, a bed of coarse granular filtering means 21, such as gravel or the like. Above the gravel bed 21 is disposed a bed of suitable water softening material 22, such as granular zeolite or other material calculated to soften hard water. An open space 23 occurs between the top of bed 22 and the top wall of unit 10.

The valve 12 comprises an integral, cast hollow member of generally rectangular shape and includes a top wall 25, a bottom wall 26 parallel thereto and a pair of parallel end walls 27, 28 interconnecting walls 25, 26. The valve 12 is open at its opposite sides, the open sides being closed by outwardly dished cover plates 29, 29a, which may be suitably bolted to the exposed edge surfaces of the walls, 25, 26, 27, 28. A peripheral gasket 30 of suitable material provides a liquid seal between the cover plates and the valve body.

Figure 4:
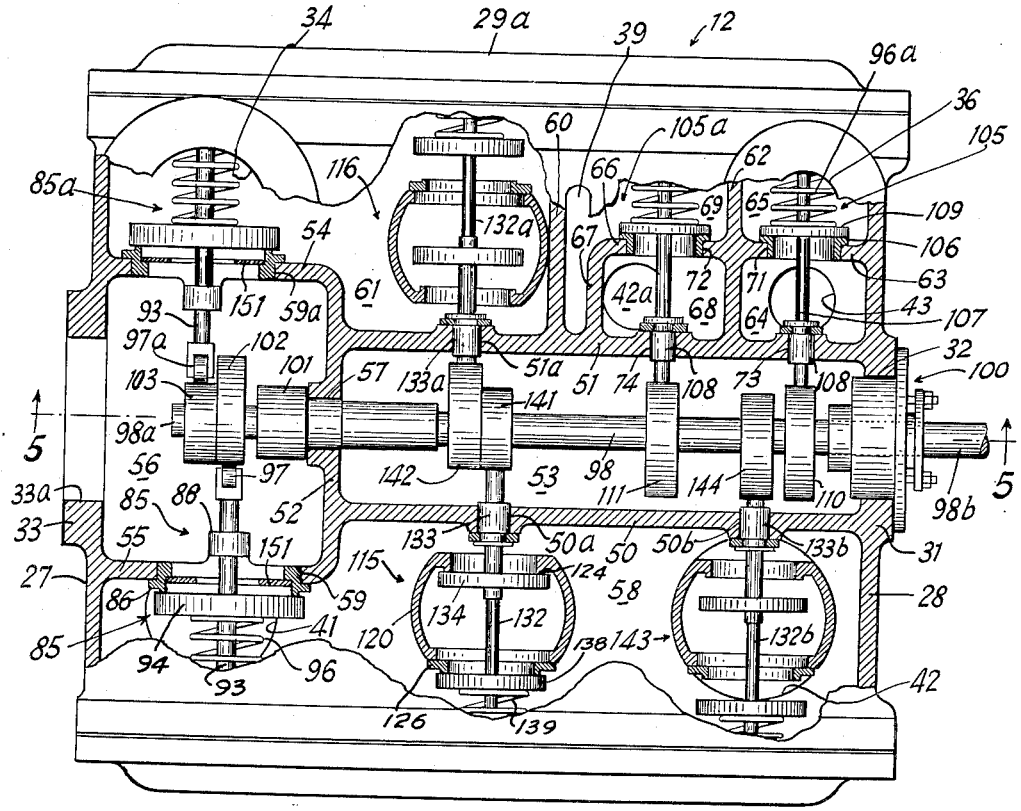
Fig. 4 is a top plan view similar to that shown in Fig. 2 with the manifold removed, with parts cut away and parts in section, showing the interior of the valve.

As shown in Fig. 4, end wall 28 is formed with a centrally disposed boss 31 extending outwardly thereof. The boss 31 is formed with a central bearing opening 32. The end wall 27 is formed with a centrally disposed boss 33. The boss 33 is formed with a port 33a aligned with opening 32.

The top wall 25 is formed with a port 34, to which conduit 11 may be suitably interconnected. The top wall 25 is also formed with a port 35 disposed diagonally opposite port 34 which is covered by a removable cover plate 35a bolted in place. The top wall 25 is further formed with a port 36 to which conduit 15 may be suitably interconnected. The wall 25 is further formed with a port 37 disposed intermediate ports 34, 36, with a port 38 disposed opposite, and in slightly offset relation to port 37, with an elongated, slotted port 39, adjacent port 37 and with a rectangular shaped access opening 40 disposed intermediate ports 37, 38, for the purposes hereinafter appearing.

The bottom wall 26 is formed with a port 41, to which conduit 13 may be suitably interconnected. The wall 26 is also formed with a port 42 which is vertically aligned with port 35 and to which conduit 18 may be suitably interconnected. The bottom wall 26 is further formed with a pair of similar, adjacent ports 42a, 43, to which conduits 16, 20, respectively may be suitably interconnected.

Figure 5:
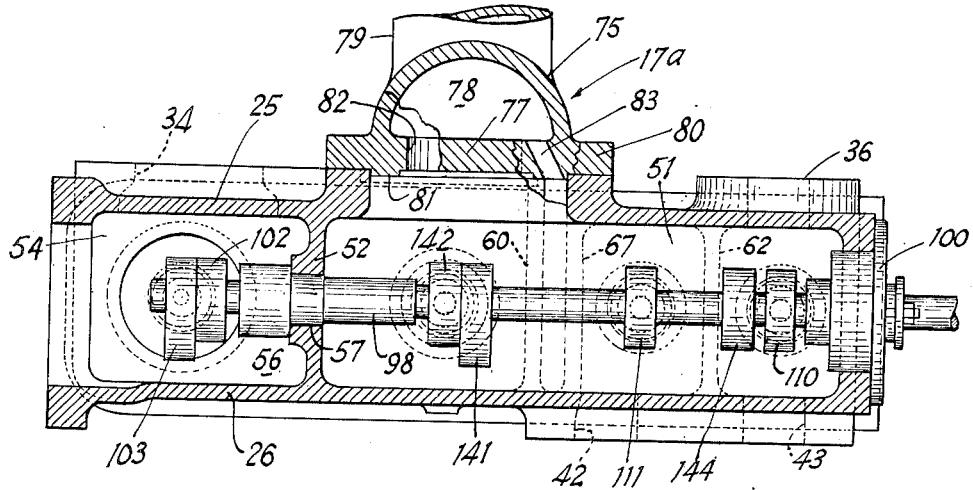
Fig. 5 is a sectional view taken on the line 5—5 in Fig. 2 and showing the manifold.

As shown in Figs. 4, 5, the interior of the valve 12 is divided into a plurality of chambers by means of upstanding partition walls interconnecting top wall 25 and bottom wall 26. A pair of parallel partition walls 50, 51, disposed on either side of the longitudinal axis of the valve, extend from end wall 28 towards end wall 27 and terminating short thereof. The walls 50, 51 are interconnected by a transverse partition wall 52, thus forming a longitudinally disposed, rectangular shaped, cam shaft chamber 53. The wall 52 includes opposite end portions projecting beyond the walls 50, 51 and which are interconnected to the end wall 27, by a pair of longitudinally extending, parallel partition walls 54, 55, thus forming a rectangular shaped, transversely disposed, outlet chamber 56. The wall 52 is formed with a bearing opening 57 which is aligned with bearing opening 32. The walls 50, 52, 55, 27, 28 and cover plate 29 define a longitudinally extending chamber 58. The wall 50 is formed with a pair of similar, spaced openings 50a, 50b disposed intermediate walls 25, 26. The wall 55 is formed with a port 59 which interconnects chamber 56 with chamber 58.

A transverse partition wall 60 disposed intermediate end walls 27, 28, extends from the wall 51 to the rear edges of walls 25, 26, thus forming with walls 51, 52, 54, 27 and cover plate 29a, a chamber 61. Wall 54 is formed with a port 59a which interconnects chamber 56 with chamber 61. The port 59a is axially offset relative to port 59.

A transverse partition wall 62, disposed intermediate walls 60, 28, extends from wall 51 to the rear edges of walls 25, 26. A short longitudinally extending partition wall 63, interconnecting walls 62 and 28, and disposed intermediate wall 51 and the rear edges of walls 25, 26 forms a pair of separated chambers 64, 65. A longitudinal projection 66 of wall 63 extends from wall 62 towards wall 60, but terminates short thereof. A transverse partition wall 67 interconnects wall 51 and the outer end of projecting wall 66, thus forming a pair of separated chambers 68, 69.

It will be apparent from a consideration of Fig. 4, that port 42a communicates with chamber 68, port 43 with chamber 64, port 36 with chamber 65, slot 39 with chamber 69, ports 34 and 37 with chamber 61, while ports 35, 38, 41, 42 communicate with chamber 58.

The walls 63, 66 are formed with similar ports 71, 72, respectively, thus affording intercommunication between chambers 64, 65 and chambers 68, 69 respectively. The wall 51 is formed with a pair of similar openings 73, 74, which are axially aligned with the ports 71, 72, respectively. The wall 51 is further formed with an opening 51a disposed intermediate walls 25, 26 and axially offset relative to opening 50a.

The manifold 17a is provided for interconnecting the conduit 17 with chambers 58, 69, 61. To this end the manifold is disposed transversely of the top wall 25 of the valve 12 and covers the ports 37, 38, the slot 39 and access opening 40. The manifold 17a comprises a semi-cylindrical top wall 75, a front wall 76 and a bottom wall 77, thus forming an enclosed chamber 78. A cylindrical inlet 79 projects upwardly from the rear end of wall 75, communicating at its lower end with the chamber 78. The conduit 17 may be suitably interconnected to inlet 79. The manifold 17a further comprises an outwardly extending peripheral flange 80 disposed in the plane of bottom wall 77, which provides means for bolting the manifold to the wall 25. The bottom wall 77 is formed on its outer surface with a rectangular shaped, raised rib 81 which is adapted to register with the access opening 40 in wall 25, thus properly positioning the manifold relative to wall 25. The wall 77 is further formed with a port 82 disposed opposite the lower end of inlet 79 and is adapted to register with port 37 in wall 25. The wall 77 is also formed with an elongated port 83 adjacent port 82, which is adapted to register with port 39 in wall 25. The wall 77 is further formed with a port 84, which is adapted to register with port 38 in wall 25.

Means is provided for cyclically controlling the flow of liquid in the various conduits interconnecting the unit 10 and the valve 12. To this end, cam operated reciprocable or poppet type valve means are suitably mounted within selected ports, in the manner hereinafter described.

As shown in Fig. 4, intercommunication between chambers 56 and 58, is controlled by means of a valve unit 85. The unit 85 comprises a combination valve seat and valve stem guide which includes a valve seat 86 mounted in port 59. A pair of oppositely disposed, curved arms extend from the seat 86, projecting through port 59 into chamber 56 and terminating in an axially bored hub 88.

A valve stem 93 is slidably mounted for guided movement in hub 88. A valve disc 94, formed with a central opening is mounted on the stem 93 for engagement with valve seat 86. The disc 94 is normally retained in engagement with seat 86 through pressure of liquid in chamber 58 and by means of a spring 96. A cam roller assembly 97 is suitably mounted on the end of the valve stem 93, which projects into chamber 56.

A valve unit 85a, similar to unit 85, is mounted in port 59a, to control the intercommunication between chambers 56 and 61. The cam roller assembly 97a on unit 85a, is slightly offset relative to cam roller assembly 97.

Means is provided for actuating valve units 85, 85a. To this end, a cam shaft 98 is rotatably mounted in cam shaft chamber 53, being supported at one end in a combination bearing and adjustable stuffing box 100, which is mounted in opening 32 in wall 28. The cam shaft 98 is further supported in an outboard bearing 101 extending from the opening 57 in wall 52. The end portion 98a of the cam shaft projects into chamber 56 and has mounted thereon a pair of cams 102, 103, which are engageable with cam rollers 97, 97a, respectively. Thus, upon rotation of cam shaft 98 to predetermined angular positions, valve units 85, 85a are operated to selectively connect chamber 56 with chambers 58, 61.

Means is also provided for controlling intercommunication between chambers 64, 65 and chambers 68, 69, respectively. To this end, similar valve units 105, 105a, are mounted in the ports 71, 72, respectively. The unit 105 comprises a valve seat 106 mounted in port 71 and a valve stem 107 slidably mounted at one end in a bushing 108 fixed in opening 73 in wall 51 and in a spring holder, not shown, at the other end thereof. The spring-holder, not shown, is similar to spring holder 90, previously described, except that it is of reduced proportions. A valve disc 109 is adjustably mounted on stem 107, in the manner described in connection with valve unit 85, for engagement with seat 106. A coil spring 96a on stem 107 retains disc 109 in its port closing position. The forward end of stem 107 projects through bushing 108 into chamber 53 and engages a cam 110 mounted on shaft 98. Similarly, valve unit 105a is actuated by a cam 111 mounted on shaft 98.

Means is also provided for controlling communication between chamber 78 in manifold 17a and chambers 58 and 61. To this end there is provided a pair of similar, double ported, balanced valve assemblies 115, 116, which are mounted in ports 38, 37, respectively.

A valve stem 132 is slidably mounted in a bushing 133 fixed in opening 50a in wall 50, for guided movement through the openings in body 117.

A valve disc 134, having a centrally opening therein, is mounted on a stem 132. A valve disc 138, similar to disc 134, is likewise mounted on a portion stem 132 for engagement with seat 126. A coil spring 139 is mounted on stem 132, abutting the disc 138 at one end thereof.

The valve stem 132 projects into chamber 53 and includes an end portion 140 engageable with a cam member 141 suitably fixed on cam shaft 98. It will be apparent that the liquid pressure within body 117 will be equally distributed with respect to the similar discs 134, 138, allowing the spring 139 which keeps the valve assembly 115 in a closed condition, to be of relatively small size.

Upon rotation of the shaft 98 to a predetermined angular position, cam member 141 will be effective to move valve stem 132 against the action of a spring 139 to open the valve assembly 115, thereby establishing communication between chamber 78 in manifold 17a and the chamber 58, by way of registering ports 38, 84.

The double ported, balanced valve assembly 116 is similar to assembly 115 and is similarly mounted in port 37 for suspension within chamber 61. The valve stem 132a of assembly 116, projects through a bushing 133a fixed in opening 51a in wall 51 and engages a cam member 142 suitably fixed to cam shaft 98. The operation of valve assembly 116 is similar to that of assembly 115 except that communication is controlled between chamber 78 of manifold 17a and chamber 61 by way of registering ports 37, 82. It is understood that the cam members 141 and 142 are contoured in a manner to permit selective connection between the raw water conduit and chambers 58, 61.

A double ported, balanced valve assembly 143, which is similar in its details to assemblies 115, 116, is mounted in an inverted position in chamber 58 through port 42 in wall 26. The valve stem 132b of assembly 143 projects through a bushing 133b fixed in opening 50b in wall 50 and engages a cam member 144 fixed on cam shaft 98. Assembly 143 is operative to control communication between chamber 58 and the soft water conduit 18, in the manner previously described with respect to assemblies 115, 116. In the event that it is desired that conduit 18 shall extend upwardly of valve 12 instead of downwardly as shown in Fig. 1, cover plate 35a is removed from port 35 to permit mounting of the assembly 143 in an upright position. The port 42 is then closed by means of cover plate 35a.

An end portion 98b of cam shaft 98, which projects outwardly of the stuffing box 100, may be suitably interconnected to a combination motor and timing device 150 whereby the cam shaft is periodically rotated to predetermined angular positions to produce a desired flow of liquids in accordance with a predetermined pattern of cyclical operation of the softening unit 10, as hereinafter described.

The size of the ports 59, 59a may be adjusted for the purpose hereinafter appearing, by means of orifice discs 151 which are removably mounted in annular recessed portions of the valve seats 86 in valve assemblies 86, 85a. A plurality of such discs having orifices of different sizes may be provided for use under different water pressures as hereinafter described.

The operation of the different valve assemblies during the cyclical operation of softening unit 10, is diagrammatically shown in Fig. 8, wherein the base lines indicate the closed position of a valve assembly and the extent and rate of opening of the assemblies is traced by the respective curves. The diagram thus shows the relative condition of the valve assemblies at any given angular position of the cam shaft through a complete revolution thereof covering the successive operations of softening, back washing, brining or regenerating and rinsing.

When raw water from conduit 17 is to be softened in unit 10, cam shaft 98 is in a position wherein cam members 142 and 144 are effective to open valve assemblies 116 and 143, respectively, the remaining valve assemblies being retained in closed condition. Accordingly, raw water is directly admitted to chamber 61 through manifold 17a by way of registering ports 37, 82 and flows outwardly into conduit 11 by way of port 34. The water is thus brought into the top of unit 10 and the softened water is removed from the bottom of the unit by means of conduit 13 which brings it directly into chamber 58 by way of port 41. The softened water then passes to the service conduit 18 by way of the open valve assembly 143 and port 42.

Figure 6:
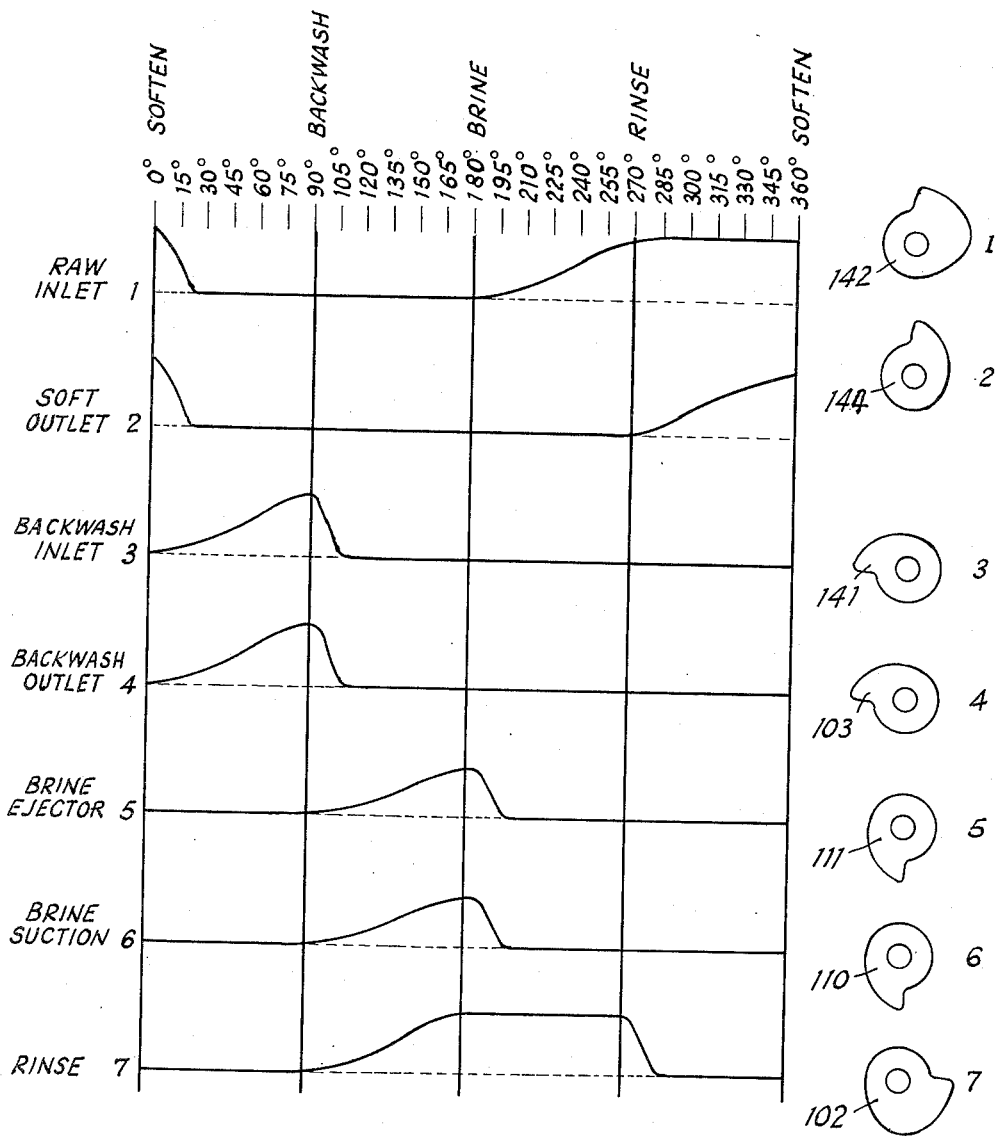
Fig. 6 is a diagram showing the cyclical pattern of operation of the valve operating cams in the multiport valve embodying the invention.

When the softening agent in bed 22 has become exhausted, the bed is back washed to remove collected sediment and the like. Accordingly, as indicated in Fig. 6, rotation of shaft 98 produces a relatively quick closure of valve assemblies 116, 143 and a more gradual opening of valve assemblies 115, 85a by way of cam members 141, 103, respectively. As a result, raw water in manifold 17a passes directly to chamber 58, through port 41 and conduit 13 into the bottom of unit 10. The water passes upwardly through bed 22, coming out of the top of the unit and passing directly to chamber 61 by way of conduit 11, from there passing to chamber 56 by way of open valve assembly 85a and thence to waste conduit 19.

After the back washing operation, the bed 22 is ready to be brined or regenerated. Accordingly, shaft 98 is rotated to a position wherein valve assemblies 85a and 115 are quickly closed and cam members 102, 110, and 111 are effective to open valve assemblies 85, 105 and 105a, respectively. As a result, raw water from manifold 17a, passes directly into chamber 69 by way of registering ports 39, 83, through open valve assembly 105a into chamber 68 and thence into injector 14a by way of port 42a and conduit 16. At the same time, a measured amount of brine from a source, not shown, is brought directly into chamber 64 by conduit 20 and passes to injector 14a by way of open valve assembly 105, chamber 65, port 36 and conduit 15. The brine is thus injected into the top of unit 10 by way of conduit 14 and trickles through the bed 22 to regenerate the same. The waste brine passes out of the bottom of unit 10 and is received directly into chamber 58 by way of conduit 13 and port 41. The waste then passes through open assembly 85, into chamber 56 and thence to waste conduit 19.

The regenerated bed 22 is then rinsed. Accordingly, shaft 98 is rotated to a position wherein valve assemblies 105, 105a are quickly closed, valve assembly 85 remains open and valve assembly 116 is opened through cam member 142. As a result, raw water in manifold 17a passes directly to chamber 61, through port 34 into unit 10 by way of conduit 11. The waste rinse water from the bottom of unit passes directly to chamber 58 by way of conduit 13 and port 41 and thence to waste conduit 19 by way of open valve assembly 85, chamber 56 and port 33a. As indicated in Fig. 8, the valve assemblies 115, 143, 85a, 105 and 105a are in their closed position during the rinsing operation.

After rinsing, further rotation of shaft 98 will cause cam member 102 to gradually close valve assembly 85, cam member 144 will gradually open valve assembly 143 and cam member 142 will retain valve assembly 116 in its open position thus restoring the system to its original condition whereby raw water is again directly passed to chamber 61 for softening, in the manner previously described.

Figure 2:
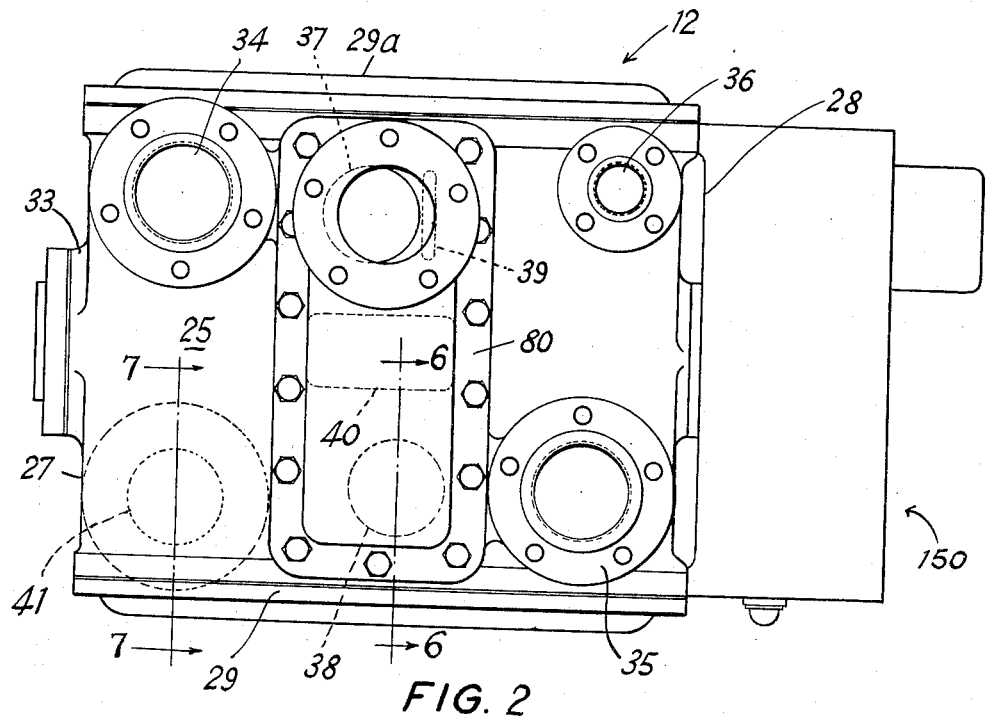
Fig. 2 is a top plan view of the multiport valve.
Figure 3:
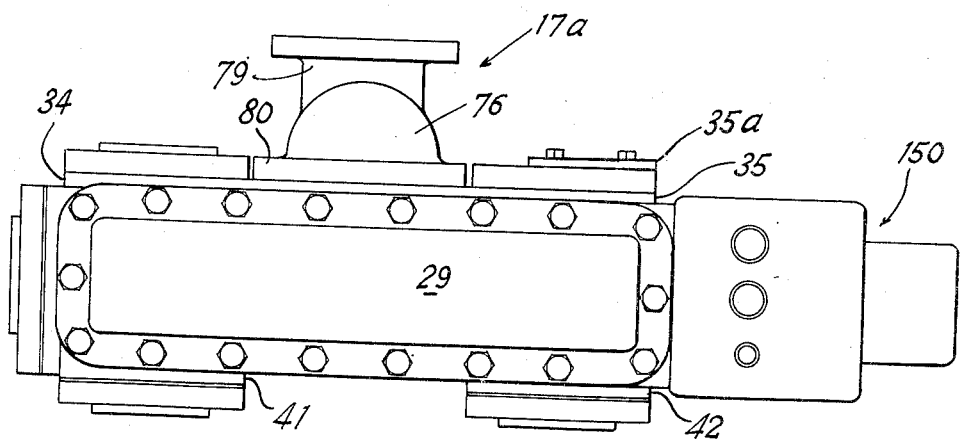

It will be apparent from a conideration of Fig. 2, that any leakage of water from chambers 58, 61, 63 and 68 through the bushings 133, 133a, 133b an 108, will pass to the cam chamber 53. The shaft 98 is readily sealed at wall 28 by means of the adjustable stuffing box 100. Accumulated liquid may leak past the packing 101, in which event, the liquid will pass to the outlet chamber 56. It will be apparent that the bushings 108, 133, 133a and 133b are subjected to substantial wear due to the reciprocatory movement of the valve stems, thus making the bushings prone to leakage. Any wear on the stuffing box 100 may be readily compensated for by suitable adjustment of the packing box.

The force necessary to effect rotation of the cam shaft 98 is reduced to a minimum, due to the design and arrangement of the cam members on the shaft. Referring to Fig. 6, it will be noted that when a closed valve assembly is to be opened, such opening is slightly anticipated by a relatively fast closing of an already open valve assembly. Aided by the liquid pressure on the spring side of such closing valve assemblies, a thrust is delivered to the corresponding cam members, thus producing a torque which tends to rotate shaft 98. Accordingly, the motor 150 which rotates shaft 98 is assisted by the supplemental torque created by the closing valve assemblies. It will be further noted that the additional torque is provided when the need for such torque is greatest, that is, at the initiation of the opening of a valve assembly. It is understood that cam shaft 98 may be rotated manually to the selected positions in the cyclical operation of the unit 10. Thus the motor 150 may be replaced by a crank and gear reduction means suitably attached to the projecting portion of the cam shaft and a dial may be provided as a guide for the soften, backwash, brine and rinse positions of the shaft.

The valve discs 94 of assemblies 85, 85a are retained in their closed position by the liquid pressure on the spring sides thereof, thus sealing the outlet chamber 56 during the softening operation. The springs 96 insure the return of the valve discs to their closed position after the discs have been moved to open position by the cam members 102, 103. Accordingly, the springs 96 may be of relatively small size, notwithstanding the size of the port being sealed and the total pressure applied to the valve discs.

The valve assemblies 115, 116 and 143, being double ported, have equalized or balanced pressures exerted against the valve discs 134, 138, thereof. In valves 12 of substantial capacity and corresponding disc size, springs 139 may be of relatively small size and still adequate to keep the valve assemblies in their closed position.

The disposition of the cam members 102, 103, and valve stems 93 within the readily accessible chamber 56, allows the valve assemblies 85, 85a to be adjusted to control the rate of flow of water through the unit 10 during back wash and rinsing operations. In this manner, the effect of high pressures in the raw water conduit 17 may be controlled to prevent undue lifting of the softening bed 22 during back washing operations and the loss of softening agent during rinsing operations. Such adjustments may be accomplished by loosening the jam nuts 95 to permit the valve stems 93 to be moved longitudinally relative to the valve discs, thus determining the maximum opening of the valve assemblies. Further adjustments may be made by removing and replacing or repositioning the cam members 102, 103, whereby the travel of the valve stems may be suitably increased or decreased.

The orifice discs 151 provide further means for controlling the rate of flow of liquid through the unit 10. The discs 151 with orifices of selected size are used to decrease the size of ports 59, 59a in accordance with the pressure in the raw water line 17 and the desired rate of flow of liquid through unit 10.

It is apparent that the chamber 61 is adapted to directly receive raw water during the softening operation and conversely, to directly dispose of waste during the back washing operation. While chamber 58 is adapted to directly dispose of soft water during the softening operation, it is also adapted to directly receive raw water during the back washing operation and to directly dispose of waste during regenerating and rinsing operations. Thus, each of the chambers 58, 61 is designed to function directly for different purposes at different points in the cyclical operation of the unit 10. It is noted that the design of the valve 12 is such as to permit all valve controls for the back washing, rinsing and regenerating operations to be contained within the valve body, thus eliminating the need for supplementary, external control means.

The construction of valve 12 as well as the arrangement of valve assemblies therein, permits the adjustment or removal of the valve assemblies and their components, with a minimum amount of effort. Removal of the cover plates 29, 29a, exposes the spring holders and valve guides for replacement or adjustment. Removal of the manifold 17a, allows admittance to the cam chamber 53 through access opening 40.

It will thus be seen that there is provided a multiport valve in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings, is to be interpreted as illustrative and not in a limiting sense.

Having thus described my invention, I claim as new and desire to secure by Letters Patents:

1. A multiport valve comprising a body formed with a central chamber, a combination water receiving and disposing chamber formed with inlet and outlet ports, disposed on either side of said central chamber and an outlet chamber communicating with each of said combination chambers through the outlet port thereof, manifold means including an inlet and a pair of separated ports, each manifold port communicating with an inlet port of a combination chamber, valve means in the inlet and outlet ports of each combination chamber and common means within said central chamber for actuating said valve means in predetermined combinations whereby said manifold inlet may be selectively and directly connected to one of said combination chambers and said outlet chamber may be directly connected to one of said combination chambers other than the selected combination chamber.

2. A valve as in claim 1 wherein said common actuating means comprises a cam shaft extending into said outlet chamber and cam members mounted thereon, the cam members for actuating the valve means in said outlet ports being disposed within said outlet chamber and accessible for replacement or adjustment whereby the rate of flow of liquid through said valve may be regulated.

3. A valve as in claim 1 wherein orifice members are removably mounted in each of said outlet ports for regulating the rate of flow of liquid through said valve.

4. A multiport valve for controlling the operation of a water softening unit comprising an outlet chamber and a pair of combination raw water receiving and waste disposal chambers in communicating relation with said outlet chamber, manifold means in direct communicating relation with each of said combination chambers, poppet valves between each combination chamber and said manifold means, a poppet valve between each combination chamber and said outlet chamber, a cam shaft and cam members thereon for actuating said valves in required combinations and sequences, each of said first mentioned valves comprising a balanced valve assembly including a seat member formed with a pair of valve seats, a valve stem and a pair of valve discs mounted thereon for engagement with said seats, and spring means engageable with one of said valve discs for moving said valve stem in one direction after said stem has been moved in the opposite direction by the operation of said cam shaft a cam member thereon, said valve discs being arranged relative to said seat member whereby liquid pressures directed against said discs tend to simultaneously open and close said valve assembly and said spring means has a strength substantially less than the total liquid pressure applicable to one of said valve discs.

5. A multiport valve as in claim 4, wherein each of said second mentioned pair of valves is unbalanced and is arranged to be retained in a normally closed position by the liquid pressure of raw water within the combination chamber in which one of said second mentioned valves is disposed.

6. A valve comprising a body formed with a pair of chambers, a pair of ports on said body respectively communicating with said chambers, manifold means in direct communication with each of said pair of ports, balanced valve means mounted in each port and extending respectively into said chambers, and common means located between said chambers for selectively actuating said valve means for controlling communication between said manifold means and said chambers.

7. A valve comprising a body formed with a pair of spaced chambers and a third chamber in communicating relation with each of said pair of chambers, a pair of ports on said body respectively communicating with said pair of chambers, manifold means in direct communication with each of said pair of ports, valve means mounted in each port for controlling communication between said manifold means and each of said pair of chambers, valve means for controlling communication between each of said pair of chambers and said third chamber and common means for selectively actuating said valve means in predetermined combinations and sequence including a portion located between said pair of chambers and a portion located within said third chamber.

8. A multiport valve comprising a valve body including a first chamber having a port, a second chamber having a port, a raw water manifold communicating directly with said ports, an outlet chamber directly communicating with said first and second chambers, a pair of communicating chambers, one of said pair of chambers directly communicating with said manifold, the other of said pair of chambers having a connecting port, a second pair of communicating chambers, each of said second pair of chambers having a connecting port, poppet valve means respectively mounted in the ports of said first and second chambers, poppet valve means between said outlet chamber and said first and second chambers, poppet valve means between the chambers of each of said pairs of communicating chambers, and cam means for actuating said valve means.

9. A multiport valve comprising a unitary body subdivided into a plurality of chambers, one of said chambers being elongated and centrally located, a second chamber being longitudinally aligned with said first chamber, a third chamber being located on one side of said first and second chambers, a fourth chamber being located on the other side of said first and second chambers, a pair of ports respectively connecting said third and fourth chambers with said second chamber, connection ports on said body respectively communicating with said third and fourth chambers, valve means in each of said ports, valve actuating means in said first chamber and including a portion in said second chamber, for operating said valve means.

10. A valve as in claim 9 and further including manifold means on said body in communicating relation with the connection ports of said third and fourth chambers, another port on said body communicating with said fourth chamber, valve means in said last mentioned port operable by said valve actuating means.

11. A valve as in claim 10 and including a pair of intercommunicating chambers located on one side of said first chamber and adjacent said third chamber, a port on said body connecting one of said pair of chambers with said manifold means, a connection port on said body communicating with the other of said pair of chambers, valve means controlling communication between said pair of chambers and operable by said valve actuating means.

12. A valve as in claim 11 and including a second pair of intercommunicating chambers located on one side of said first chamber and adjacent said first pair of communicating chambers, a pair of connection ports on said body respectively communicating with said second pair of chambers, and valve means controlling communication between said second pair of chambers and operable by said valve actuating means.

JOHN R. RHINEHART.
CHARLES H. ESHRICH.

References Cited in the file of this patent

UNITED STATES PATENTS

| Number | Name | Date |
|---|---|---|
| 848,487 | Nishazaki | Mar. 26, 1907 |
| 1,450,663 | Christman | Apr. 3, 1923 |
| 1,676,891 | Dunkelberg | July 10, 1928 |
| 2,012,194 | Hughes | Aug. 20, 1935 |
| 2,052,515 | Pick | Aug. 25, 1936 |
| 2,231,460 | Barman | Feb. 11, 1941 |
| 2,243,937 | Almond | June 3, 1941 |
| 2,265,520 | Eickmeyer et al. | Dec. 9, 1941 |
| 2,316,944 | Ernst | Apr. 20, 1943 |
| 2,349,069 | Ashton | May 16, 1944 |
| 2,435,546 | Mercier | Feb. 3, 1948 |
| 2,460,011 | Hungerford | Jan. 25, 1949 |